Feb. 27, 1934.  R. P. DE VAULT  1,948,516
LIGHT RAY PROJECTION APPARATUS
Filed Dec. 18, 1924  5 Sheets-Sheet 1
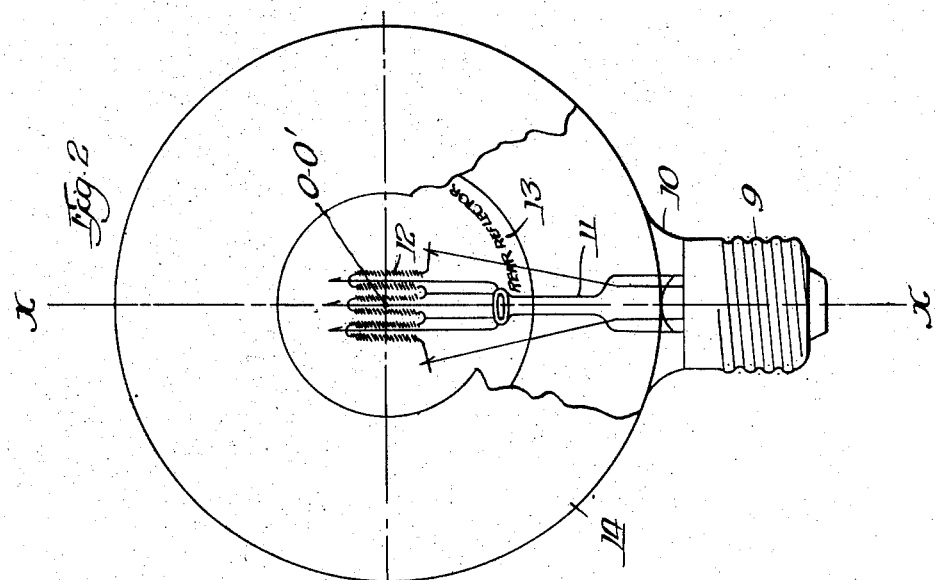
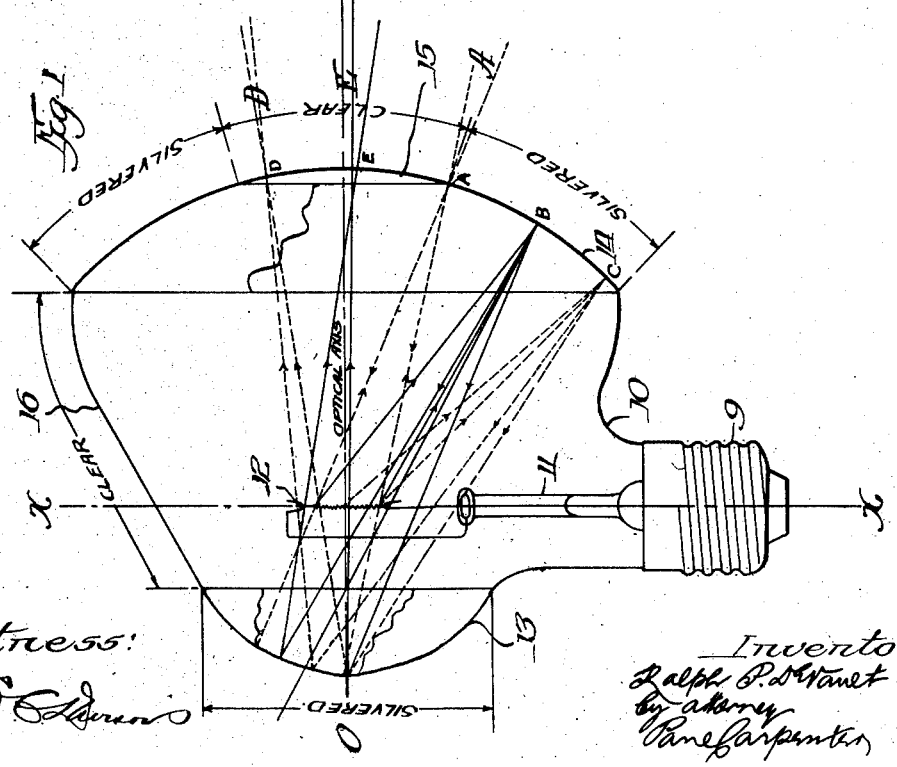

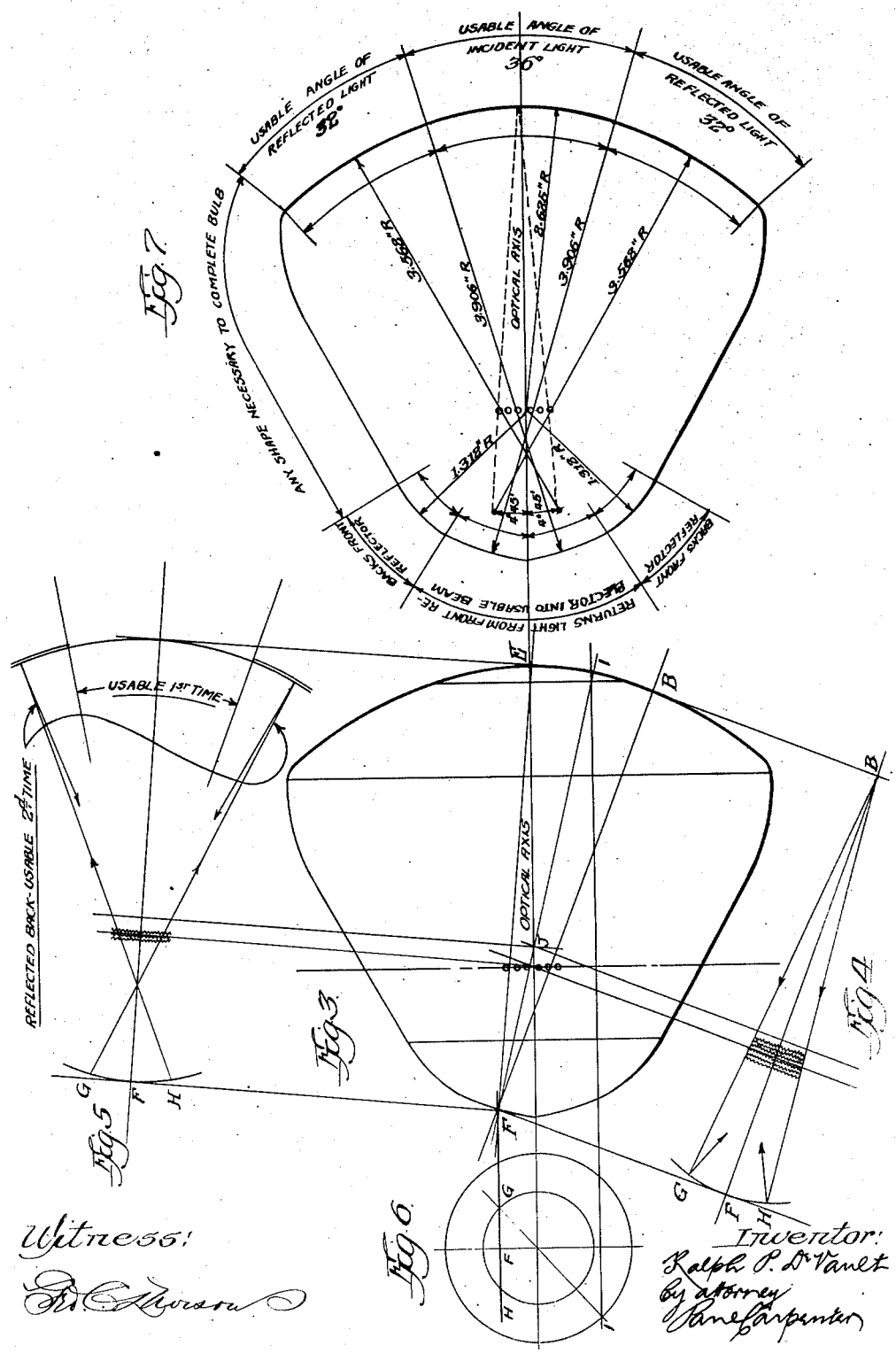

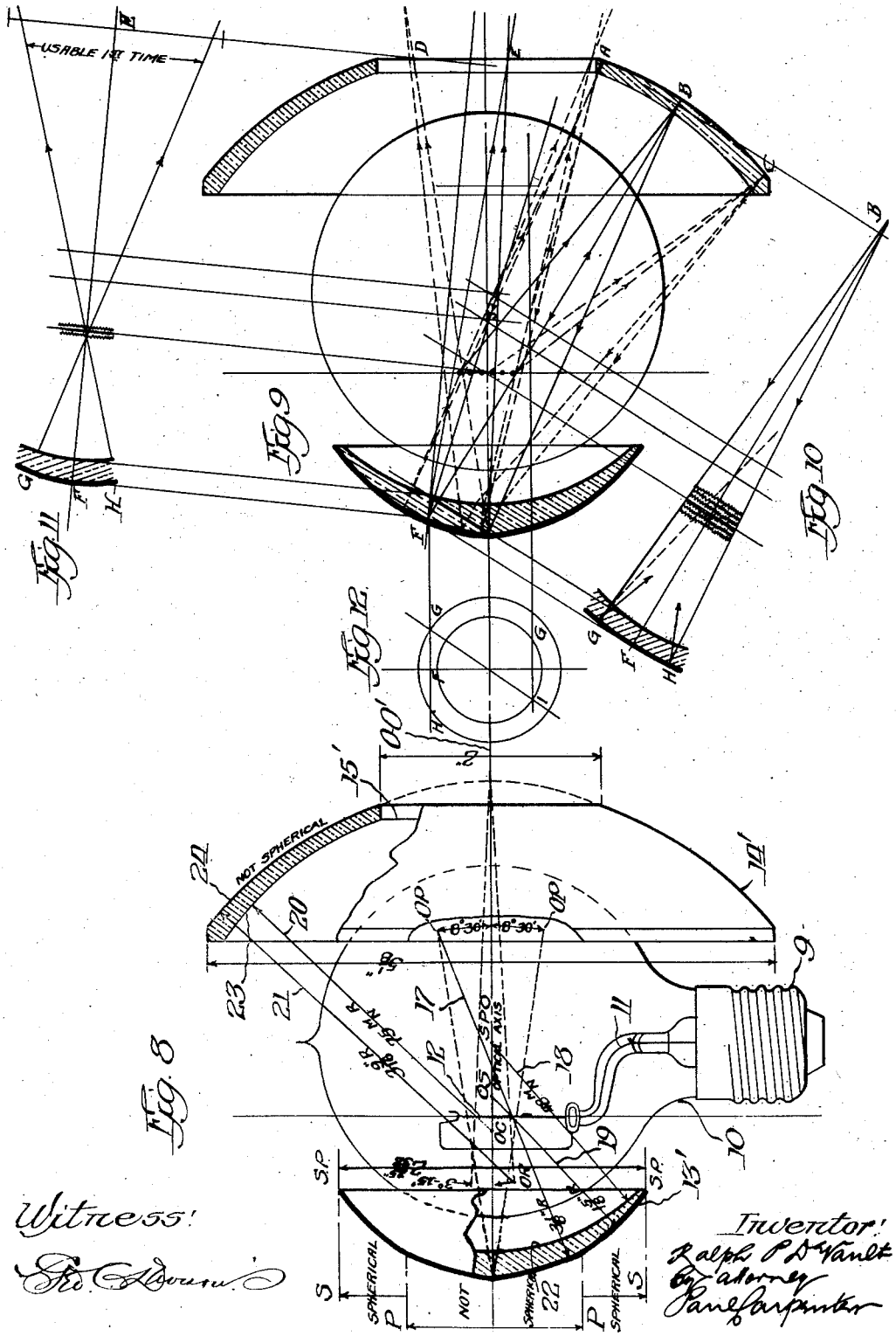

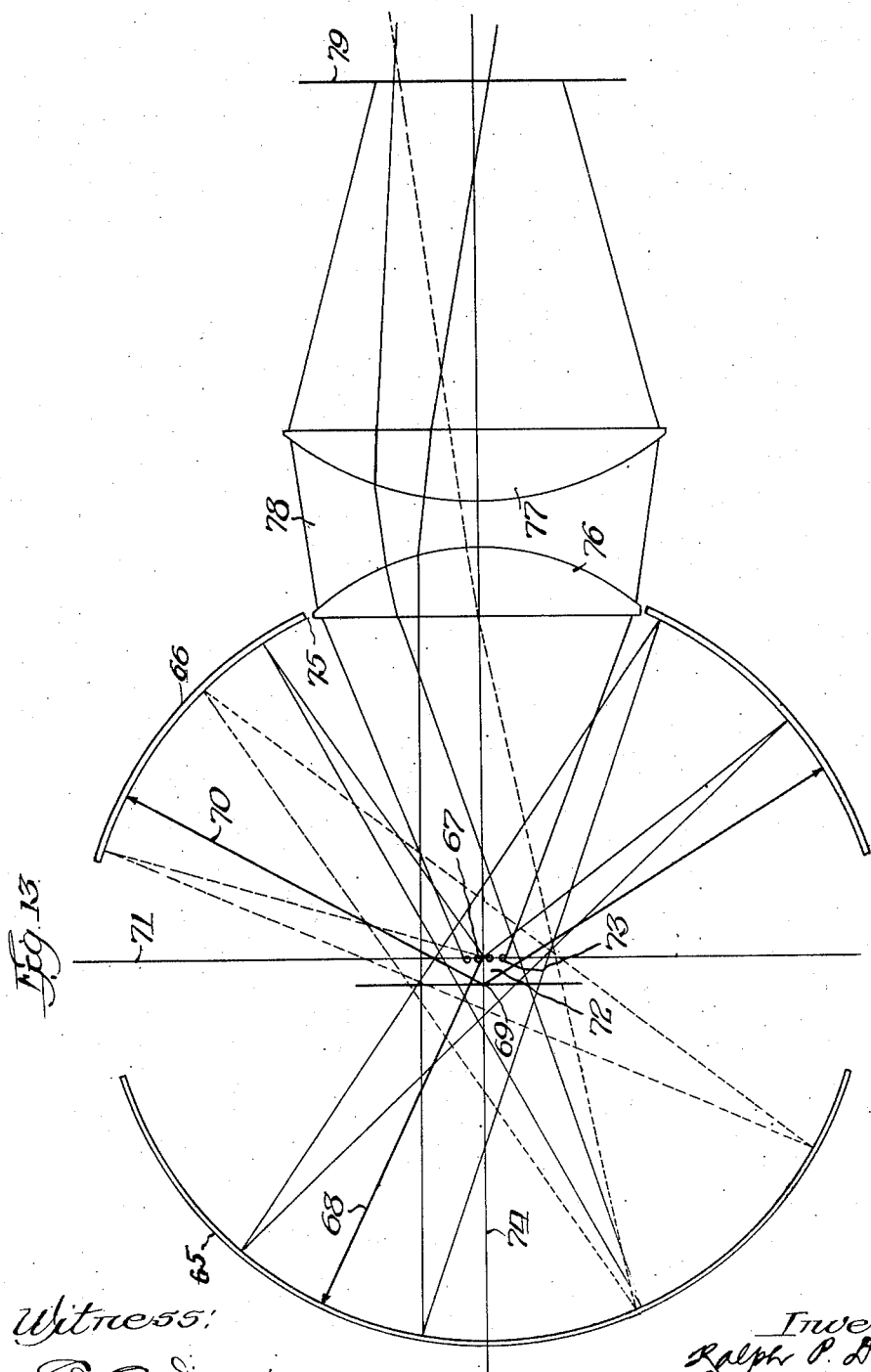

Feb. 27, 1934.  R. P. DE VAULT  1,948,516
LIGHT RAY PROJECTION APPARATUS
Filed Dec. 18, 1924  5 Sheets-Sheet 5
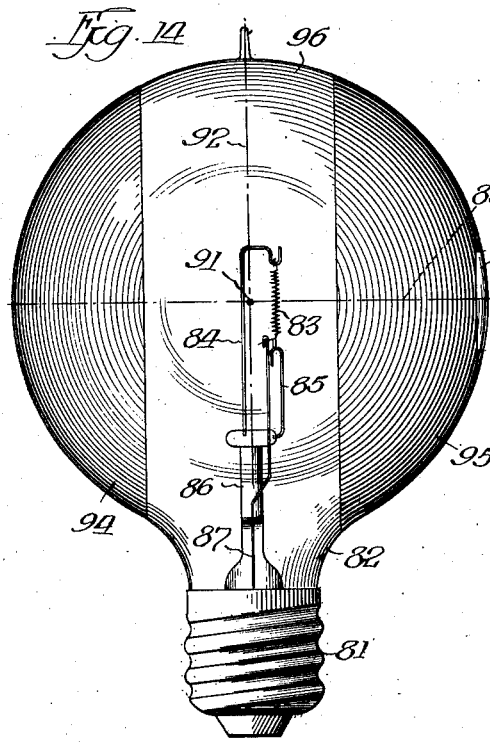
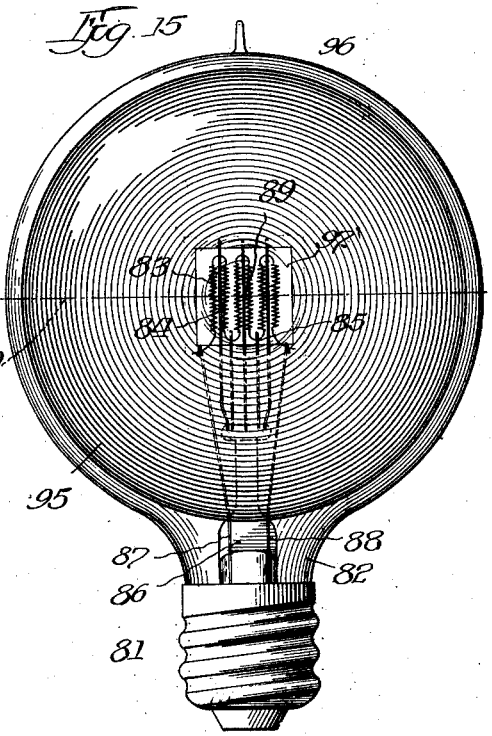
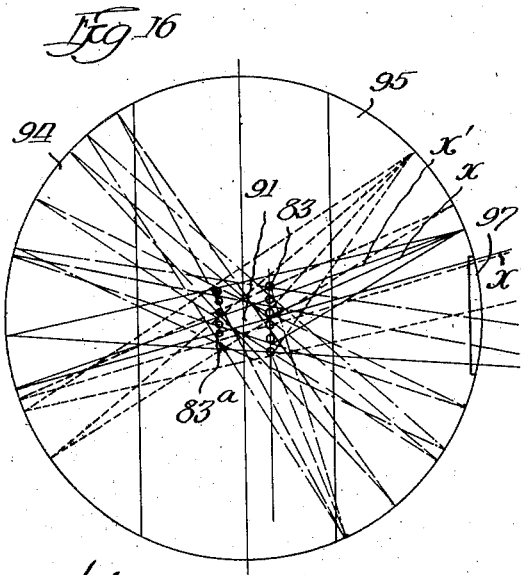
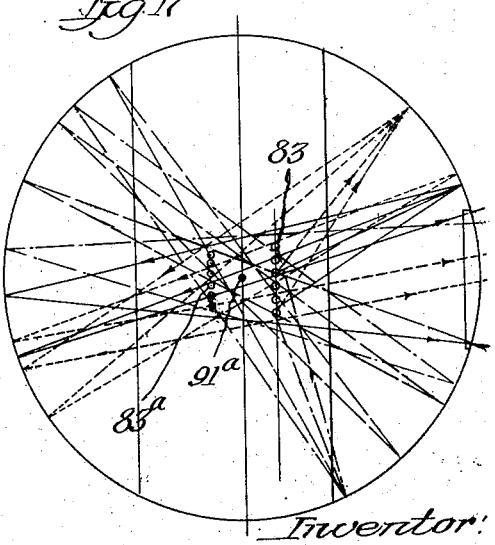

Patented Feb. 27, 1934

1,948,516

UNITED STATES PATENT OFFICE 1,948,516

LIGHT RAY PROJECTION APPARATUS

Ralph P. De Vault, Villa Park, Ill., assignor, by mesne assignments, to Acme Motion Picture Projector Company, Chicago, Ill., a corporation of Illinois Application December 18, 1924
Serial No. 756,738

10 Claims. (Cl. 240—41.3)

This invention relates broadly to the projection of light rays, and pertains to the projection of light rays from a centralized or other artificial source of light, more particularly to the attainment of improved projection of light rays for employment in motion picture projecting apparatus.

While this invention is illustrated and described more particularly as a motion picture projecting apparatus, it will be understood that it is not contemplated that the invention be limited to this adaptation, but finds a wide field of utility for other purposes.

The principal objects and advantages which characterize this invention are expressed in the provision of improved means for projecting light rays, the provision of improved means for projecting light rays from a centralized source of light; the provision of improved means for projecting light rays with increased intensity in the useable angle of incident light; the provision of improved means for increasing the intensity of light projected from a source of light of predetermined intensity; the provision of improved means for collecting and projecting light rays from a source of light indirectly situated with respect to an object to be projected.

This invention is further and more specifically characterized by the provision of an improved arrangement of reflecting surfaces for projecting light rays from a light source substantially encompassed by said surfaces; and the provision of an improved arrangement of combination reflecting surface for projecting light rays in a substantially cylindrical form or plurality of concentric cylindrical forms.

The provision of improved projecting means characterized by the combination with a surface of revolution which is an arc of a circle whose center is offset from the axis of revolution, in further combination with a curvilinear arc having its center coincident with the axis of rotation, of a source of light transverse to the axis of rotation.

The provision of improved projecting means characterized by the combination of reflectors which are portions of a surface of revolution which is an arc of a circle whose center is disposed from the axis of rotation, and a surface of revolution of an arc of a circle having its center coincident with the axis of revolution and a reflector spaced therefrom which is a surface of revolution of an arc of a circle whose center is disposed from the axis of rotation of a source of light transverse to the axis of rotation therebetween.

Further this invention is specifically characterized by the provision of reflectors with a source of light encompassing substantially all of the effective light emitted from said source and reflecting the same so that the light rays are brought into the useable angle of incident light with maximum effectiveness.

This invention is further characterized by the provision of reflectors encompassing a large portion of the effective light from a light source such as is included in an electric bulb and still permitting circulation therefrom of radiant heat thereof.

This invention is still further characterized by the provision of reflectors encompassing substantially a large portion of the effective rays from a light source and emitting the same in single beam by reflectors and collecting reflectors whose surfaces embody reflective curves characterized by the revolution of arcs of circles so that grinding and forming thereof may be accomplished by simple grinding means and the beam of light so emitted be substantially free from dark spots of non-reflective surfaces.

This invention is still further characterized by the provision of a projecting apparatus having a projecting reflector which throws a beam of light upon an object said incident beam passing through a ray-collecting reflector which adds to the projecting reflector light not encompassed by the path of the incident beam, said additions being made without formation of dark spots in the incident usable beam; further the provision of an embodiment of reflectors whereby the intensity of light rays projected from a source of light may be increased in efficiency, with the consequent reduction in power required; and the embodiment of the foregoing elements with their advantageous features in a structure which is simple, compact, efficient in operation and capable of production at low cost.

The foregoing, and such other objects and advantages as may appear or be pointed out as this description proceeds, are attainable with structural arrangements, which are illustrated in the accompanying drawings, in which:

Figure 1 is a fragmentary side elevation of a form of my device including diagrammatic illustration of the path of light rays.

Figure 2 is a fragmentary front elevation of the device in Figure 1.

Figure 3 is a diagrammatic plan view showing the position of the cutting planes for illustrating the direction of rays in Figures 4 and 5.

Figure 4 is a section on the line B F, of Figure 3, and revolved into horizontal plane;

Figure 5 is a section on the line F—E of Figure 3, and revolved into the horizontal plane;

Figure 6 is an end view for illustrating the position of the cutting planes used in developing Figures 4 and 5;

Figure 7 is a diagrammatic plan view of the device;

Figure 8 is a fragmentary side elevation of a modified form of my device;

Figures 9, 10, 11 and 12 are diagrammatic views similar to Figures 3, 4, 5 and 6, but shown in conjunction with a modification as shown in Figure 8;

Figure 13 is a semi-diagrammatic sectional view of a further modified form of this invention;

Figure 14 is an elevational view of a further alternative form of this invention;

Figure 15 is an elevational view of the device of Figure 14 viewing the device from the right hand side of Figure 14; and Figures 16 and 17 are schematic views illustrating the manner in which the light rays are projected of the embodiments illustrated in Figures 14 and 15.

Referring more particularly to the drawings in Figure 1, 10 is an electric bulb having in the pedestal 11 thereof a filament 12 of the monoplane type centrally located upon the axis O—O', hereinafter referred to as the optical axis. The bulb 10 has preferably formed thereon curvilinear surfaces silvered to form a projecting reflector 13 and a collecting reflector 14 centrally and transversely located with their axes coincident with the optical axis O—O' and positioned on each side of the filament. The collecting reflector 14 is formed with a clear portion 15 acting as a ray-conveying aperture. Clear portions 16 spanning the distance between the reflectors 13 and 14 complete the bulb. The relative position and sizes of the reflectors are indicated by the parts designated by the legends. The reflectors 13 and 14 are surfaces which are portions of spheroids forming concavo-convex reflectors and may be spheroids generated by portions of arcs of circles whose centers are coincident with the axis of rotation, or disposed from the axis of rotation; preferably, however, they may be a combination of the two, that is, an extended arc having the inner portion an arc of a circle whose center is disposed from the axis of rotation and an outer portion which is the surface generated by an arc of a circle whose center is coincident with the axis of rotation.

Upon viewing Figure 1, and the diagrammatic representations of the rays in reference to silvered portions which act as the reflectors, the direction of light rays lying in the plane of the paper strike the front at three characteristic points, A, B and C. All the light striking at A, is reflected back through the filament to the rear reflectors where its direction is reversed and it is sent back again to the point E. The point A it is to be noted is exactly on the border line of reflection. Now all the light under consideration striking at point B is reflected out at point E, therefore all the rays striking from A to B are projected out from A to E. Now passing on from B to C the same thing takes place, this light coming out between E and D. From B, however, as we pass on to C the usable angle of light begins to narrow until at C we can only use about one-half the filament. This condition is necessary in order to preserve the rays in the reflected beam as nearly as possible in parallelism to the optical axis, with the maximum degree of intensity in the useable angle of incident light.

Figure 2 shows the position of the filament 12 with its center on the optical axis O—O' and exposing to view the rear reflector 13 by the broken line shown.

Referring to Figures 3 to 6: The intersecting planes are drawn through F E and F B. Figure 6 shows the means of determining the points of intersection of the planes of reference with the reflectors.

Figures 4 and 5 show the direction of the rays within the planes of reference and the direction which the rays B G and B H are returned through the filament and converted to usable rays.

Figure 7 is a further diagrammatic view defining the reflectors on a bulb surface outline and is legended to indicate the function of each area of the bulb surface.

It will be noted that though I have described in Figures 1 and 2 a bulb having both a projecting and collecting reflector formed as a portion of the surface of the bulb, either one of the reflectors alone may be formed as part of the bulb, particularly the front collecting and ray-conveying reflector, where it is desired to facilitate positioning of the front reflector at a greater distance from the filament than the rear reflector and obtain maximum parallelism of the rays of the consummate incident beam.

Advantages other than the elimination of waste by the bulb illuminating device, will appear, such as prevention of losses as a result of repeated passing of light through the glass of the bulb; also the radiant heat will be permitted to be dispersed through the clear portions of the bulb joining the reflector portions.

Figure 8 illustrates a modification of my device in which 13' is a projecting reflector and 14' a ray-collecting and conveying reflector, wherein 15' is an aperture or clear portion for conveying the beam of light directly or indirectly emitted from the filament.

The filament 12 is of the monoplane type and has its center on the optical axis O—O' and its plane surface transverse thereto. The reflectors are of the concavo-convex type and are preferably formed so as to include spheroidal surfaces of compound curves of revolution. The axes of rotation of both reflectors are coincident with the axis O—O'.

A portion P—P, which is ground on the central portion of the reflector, is that surface formed by the revolution of an arc of a circle indicated by radius arm 17, having its center O P disposed from the axis of rotation. The other portion S—S, of the reflector surrounding the surface P—P, is a portion of a spheroid and is generated by revolving an arc of a circle whose radius 19 has its center as O S on the axis of rotation.

The concave portion of the reflector 22 is a portion of a sphere formed by the revolution of an arc of a circle having its center S P O on the axis of rotation and whose radius is indicated at 18. The reflector 13' has the surfaces P—P, S—S silvered to form the reflective surfaces.

The collecting reflector has its concave portion 23 formed as a portion of a sphere whose generating arc is a portion of a circle which has its center O C on the axis of rotation and whose radius is indicated as 20. The reflective surface 24 is a portion of a spheroid formed by the revolution of an arc of a circle having its center of generation disposed from the axis of rotation, as at O R, and has its radius as indicated at 21. The reflective surfaces are preferably positioned in reference to each other so that the radii 18, 19 overlap with the radius of the ray-collecting reflector 14'.

The surface 24 is silvered to form the reflective surface of the reflector, leaving the portion 15' unsilvered where no aperture is formed in the reflector 14'.

The filament is positioned in reference to the projecting reflector 13' so that light rays with a maximum degree of parallelism to the optical axis reinforce the incident beam through the aperture upon the object.

Figures 9, 10, 11 and 12 are similar to Figures 3, 4, 5 and 6, which have reference to the bulb type of reflector, and the parts, having corresponding primary numerals in those figures serve the same function.

Referring now to Figure 13, there is illustrated an alternative form of the present invention embodying improvements in an arrangement of reflectors whereby substantially all of the rays of light may be extracted from a light source, and when this device is employed in its entirety as shown, it materially enhances the attainable efficiency of light projection.

This device involves broadly the positioning of a light source between two opposed hemispherical or other concavo-convex reflectors, the light source being situated at a point between the respective centers about which said reflectors are described, the radii of said reflectors overlapping, so that the source of light is disposed in an area defined by such overlapping radii.

While not essential, it is desirable that the curvature of the two reflectors be dissimilar, that is, described by radii of different lengths, as shown.

In structurally carrying out this form of the invention, I provide the two reflectors 65 and 66, made each in the form of concavo-convex hemispheres, and arranged as shown coaxially in spaced relationship. For the purpose of convenience in describing, the reflector 65 is termed the rear reflector, and 66 the front reflector. The rear reflector is described about a center 67 on a radius 68, and the front reflector is described about the center 69 on a radius 70, which is of a length greater than that of the radius 68. Thus the span of the front reflector is greater than that of the rear reflector.

The reflectors are so positioned that a peripheral space is afforded between them, and so that their respective radii overlap. In the area 72 defined by such overlapping radii, the source 73 of light is placed. This source of light is similar to that shown in Figure 1 and is in a plane transversely disposed with respect to the longitudinal axis 74 of the device. The light source 73 may be adjusted toward or away from either of the reflectors along the axis 74, or transversely thereof. Thus, the light source may be disposed at one or the other of the centers 67 or 69 or between them, as found most satisfactory. I find that satisfactory results are attained by positioning the light source as shown in Figure 13.

The front reflector is provided with an axial aperture 75, through which the light rays from the source 73 pass into and through the lenses 76 and 77 of a condensing device 78, whence the condensed rays issue through the shield 79 through a picture onto a screen, when used in projection of motion pictures.

It will be observed that the device of Figure 13 is readily adaptable for use in conjunction with or as alternative to the structures shown in my application Serial No. 600,974, and that the reflectors 65 and 66, light source 73, condensing device 78 and shield 79 are all capable of relative adjustment by the provision therewith of the various adjustable supports therein described. I am thus enabled to provide a device of wide utility possessing high efficiency, and capable of required adjustments in use.

It will be observed that in the operation of the device shown in Figure 13 the light rays issuing from the light source shown, which, as previously pointed out, is preferably flat and transversely arranged to the axis of the device, will reflect from the front to the rear reflector, thence through the aperture provided in said front reflector and through the condensing device.

With the arrangement of reflectors and lens described in my application aforementioned I am enabled to extract or collect a greater number of rays from a lamp of a given size and wattage than has heretofore been possible, and in this way I am enabled to reduce the power required for projecting light at the required intensity for motion picture work.

Referring now to Figures 14 and 15, I provide a reflector which conveniently takes the form of an incandescent lamp, including the base 81, and substantially spherical glass bulb 82.

The light source includes a filament 83 supported by bracket wires 84 and 85 upon a pedestal 86, the filament shown being of the monoplane type and rendered incandescent by current supplied by the conductors 87 and 88. It will be observed that the filament is substantially symmetrically and uniformly disposed about the longitudinal (projection) axis 89 and horizontal (transverse) axis 90, and disposed forward of the geometrical center 91 of the bulb 82, though, for a purpose which will presently appear the center of the filament may be and preferably is disposed slightly to one side of the projection axis 89.

The filament 83 is disposed substantially vertically, that is, substantially parallel to the axis 92 transverse or normal to the projection axis 89, and while the filament is preferably disposed beyond the center 91, that is, toward the direction of projection, the filament may, with satisfactory results, be disposed rearwardly of the center 91, that is, in a position away from the direction of projection.

While the filament is shown as monoplane in form, it is not essential that this form be adhered to, for the reason that the filament may be any other convenient symmetrical shape which will dispose the same substantially uniformly about the two axes 89 and 90. It is, however, desirable for greatest efficiency that the filament be displaced from the center 91, be substantially symmetrical relatively to the axis 92, and be centrally disposed with respect to the axis 89.

The bulb 82 of the lamp is provided with a substantially continuous reflecting surface, including the silvered portions 94 and 95, a clear space 96 being left to permit the ready escape of heat. I have found that the space 96 may be omitted, but by providing this space the life of the filament is lengthened, and the space as provided in the drawings in proportion to the reflecting surface has been found to operate very successfully, because the major portion of the light rays are thrown laterally of the plane in which the filament 83 lies, and therefore only a relatively small amount of effective light escapes through the space 96.

The reflecting surface 95 is provided with an outlet 97 for projected light rays which is preferably substantially rectangular in form and of a dimension substantially conforming to the size of the framing opening, commonly called the aperture, of a motion picture projector, said outlet 97 being preferably conveniently disposed uniformly about the axis 89 and that the filament 83 is therefore substantially centrally located with respect to the outlet.

As previously pointed out, I have found it desirable that the filament be slightly offset with respect to the axis 89 as viewed in Figure 15, so that the reflected images of the parallel coils of the filament 83 will be offset between the actual filament coils and thus the intensity of the light reflected and projected from the filament is increased. This same effect may be obtained by slightly rotating the pedestal 86 upon installation, but the straight effect is to be preferred. I have demonstrated this by illuminating the filament with a low current and the effect may be observed by looking through the lens which is usually employed with the projection lamp. The reflected images of the filament 83 are indicated in dotted lines at 83a in Figures 16 and 17.

The effectiveness of the system of reflectors, and position of the filament as shown with respect thereto, may be seen from an inspection of Figure 16. The advantage of placing the filament forward of the geometrical center 91 of the bulb and of the reflecting surface resides in the fact that no light rays can oscillate back and forth from the reflecting surface 94 to the reflecting surface 95 through the center 91 and thus be lost in heat, the position of the filament being such that any rays which emanate from the filament and which strike the reflecting surfaces eventually pass out through the outlet 97. This is demonstrated by the light ray X which comes from substantially the center of the filament, strikes the reflector 95, is reflected as at X' to the reflector 94 and thence is reflected through the outlet 97 as at X''. This will be true of substantially all available rays emanating from the filament. Figure 17 serves to illustrate an arrangement wherein the source of light is displaced a greater distance from the center of the bulb so that the amount which the filament is off center must be accurately determined by experiment to obtain the best results, but it will be obvious from a comparison of Figures 16 and 17 that there are limits within which this feature may be applied practically.

By this arrangement it will be seen that the light rays are projected tangentially of the geometrical center of the lamp while many of the rays emanating to the rear of the filament are reflected back between the coils of the filament, and these rays are the reflected images of the coils of the filament previously referred to. I have found that this type of lamp, when of a given wattage, increases the light projected from 3.0 to 3.5 times the light projected by other known means. It has been demonstrated that a lamp of this type with a rating of 400 watts projects more light and a whiter light onto a screen than lamps of the present types and employing other reflecting means under similar conditions with as high ratings as 1000 watts.

I realize that the positioning of the filament off center in the lamp has either accidentally occurred or been intentially done in various types of lamps, but to my knowledge in many of these cases there is no system of reflecting surfaces or surface with which the filament cooperates in a like manner to that disclosed here, and that such lamps as are known to me to have the filament off center are generally employed with a single reflector and are quite common in automobile headlight practice where the filament is set closer to the base than to the tip of the lamp so as to bring the filament closer to the parabolic reflector commonly employed in automobile headlights, but the results obtained there do not in anywise approximate the results produced by the present invention.

It will be understood that the silvered surfaces of the bulb 82 may be substituted for by the provision of a pair of separate hemispherical reflectors, forming a substantially spherical reflecting surface, such, for instance, as by employing two reflectors like that shown in Figure 8, where the reflectors 94 and 95 would then be separate from the bulb, and, if desirable, adjustably associated so that the best results may be obtained from a particular bulb.

Having thus described my invention and illustrated its use, what I claim as new and desire to secure by Letters Patent is:—

1. In a light projection apparatus which includes opposed reflectors about a light source, one reflector comprising a surface generated by the revolution of combined continuous curvilinear circular arcs, one of which arcs has its center on the optical axis of the apparatus which serves as the axis of rotation, and the other an arc of a circle whose center is not on the axis, and disposed remote from the axis, the radii of said arcs being of different lengths.

2. In a light projection apparatus which includes opposed reflectors about a light source, one reflector comprising a surface generated by the revolution of combined continuous curvilinear circular arcs, one of which arcs has its center on the optical axis of the apparatus, which serves as the axis of rotation, and the other an arc of a circle whose center is not on the axis, the radii of said arcs being of different lengths and the center of said shorter radius serving to define the surface more remote from the optical axis.

3. In a light projection apparatus, in combination, a source of light, a projecting reflector which embodies a surface generated by the revolution of combined curvilinear circular arcs, one of which has its center on the optical axis of the apparatus, which serves as the axis of rotation and adjacent the same and the other an arc of a circle whose center is not on the axis and disposed remote from the axis and more remotely than the first center, said reflector being on one side of said light source, and a ray conveying condenser reflector on the other side of said light source.

4. In a light projection apparatus, in combination with a source of light, a projecting reflector on one side of said light source and a ray conveying condenser reflector on the other side of said light source, said first mentioned reflector embodying a reflecting body generated by the revolution about the optical axis of the apparatus of a combined curvilinear line comprising, in its major characteristics, portions of circles having the generating curve thereof described by circles of different length radii, the center of one of the said arcs being on the optical axis of the apparatus.

5. In a light projection apparatus, in combination, a source of light comprising an incandescent filament lamp of the mono-plane type, symmetrically, uniformly positioned on the optical axis of the apparatus, a projecting reflector on one side of said light source, and a ray conveying condenser reflector on the other side of said light source, both reflectors including reflective surfaces which embody spheroids of different length radii, arranged with their centers in spaced relationship and their radii overlapping, the radius of the second reflector being of greater length than the radius of the first reflector, the light source being located within the space between the centers of said spheroids.

6. In a light projection apparatus, in combination, a source of light, a projecting reflector on one side of said light source and a ray conveying condenser reflector on the other side of said light source, said first mentioned reflector embodying a reflecting body generated by the revolution about the optical axis of the apparatus of a curvilinear line resulting from the combined circular arcs of different length radii.

7. In a light projection apparatus, in combination, a source of light comprising an incandescent filament of the monoplane type, symmetrical with the optical axis of the apparatus, a projecting reflector on one side of said light source, and a ray conveying condenser reflector on the other side of said light source, said first reflector embodying a reflective surface generated by the revolution about the optical axis of the apparatus of combined arcs of circles, one arc having its center on the optical axis, and the other arc having its center not on the axis.

8. In a light projection apparatus, in combination, a source of light, an incandescent filament lamp of the monoplane type, a projecting reflector on one side of said light source, and a ray conveying condenser reflector on the other side of said light source, said first mentioned reflector embodying a reflective surface generated by the revolution about the optical axis of the apparatus of a curve resulting from the combined circular arcs of circles whose centers are spaced from each other, said last mentioned reflector embodying a reflective surface generated by the revolution of a circular arc having its center not on the optical axis.

9. In a light projection apparatus, in combination, a source of light comprising an incandescent filament of the monoplane type, a projecting reflector on one side of said light source, and a ray conveying condenser reflector on the other side of said light source, each of said reflectors being generated by revolution about the optical axis of the apparatus of circular arcs, said last mentioned reflector having its generating arc with its center not on the optical axis, the radii of the arcs of generation of each of the surfaces of the reflectors being positioned in overlapping relation.

10. The combination of opposed substantially hemispherical reflectors arranged in axial alignment, with their centers of the curves of generation in spaced relationship and their radii overlapping, and a source of light arranged between said centers and disposed uniformly and symmetrically about the optical axis of the apparatus, transversely to the optical axis of said reflectors.

RALPH P. DE VAULT.